(12) United States Patent
Mazumdar et al.

(10) Patent No.: US 8,303,695 B2
(45) Date of Patent: Nov. 6, 2012

(54) SYSTEMS FOR COMPRESSING A GAS

(75) Inventors: Anindra Mazumdar, Katy, TX (US); Sunil Ramabhilakh Mishra, Pearland, TX (US); Rupinder Singh Benipal, Houston, TX (US)

(73) Assignee: General Electric Company, Schenectady, NY (US)

( * ) Notice: Subject to any disclaimer, the term of this patent is extended or adjusted under 35 U.S.C. 154(b) by 355 days.

(21) Appl. No.: 12/781,781

(22) Filed: May 17, 2010

(65) Prior Publication Data

US 2011/0277860 A1 Nov. 17, 2011

(51) Int. Cl.
*B01D 53/02* (2006.01)

(52) U.S. Cl. ........... 96/109; 95/139; 48/77; 137/565.01; 137/565.18; 96/128

(58) Field of Classification Search .................... 95/139; 96/131; 48/77; 137/565.01, 565.18
See application file for complete search history.

(56) References Cited

U.S. PATENT DOCUMENTS

| | | | | | |
|---|---|---|---|---|---|
| 3,212,279 | A | * | 10/1965 | Cope | 62/48.2 |
| 3,417,572 | A | * | 12/1968 | Pryor | 62/634 |
| 3,801,708 | A | * | 4/1974 | McLeod | 423/650 |
| 4,353,713 | A | * | 10/1982 | Cheng | 48/202 |
| 4,928,498 | A | * | 5/1990 | Gossler | 62/81 |
| 5,061,465 | A | * | 10/1991 | Carter | 423/229 |
| 7,766,999 | B2 | * | 8/2010 | Ha | 95/114 |
| 2009/0095155 | A1 | * | 4/2009 | Frydman et al. | 95/172 |
| 2010/0272619 | A1 | * | 10/2010 | Frydman et al. | 422/193 |
| 2010/0325958 | A1 | * | 12/2010 | Molaison | 48/128 |
| 2011/0229382 | A1 | * | 9/2011 | Frydman et al. | 422/621 |

OTHER PUBLICATIONS

U.S. Appl. No. 12/781,778, filed May 17, 2010, Anindra Mazumdar et al.

* cited by examiner

*Primary Examiner* — Duane Smith
*Assistant Examiner* — Christopher P Jones
(74) *Attorney, Agent, or Firm* — Fletcher Yoder P.C.

(57) ABSTRACT

Systems are provided for gasification operations. The systems may use carbonous gas as part of plant operations. The systems may include a first compressor configured to compress a carbonous gas and a controller. The controller is configured to control the first compressor to transition from compressing a first carbonous gas to compressing a second carbonous gas during startup of a gasification system.

29 Claims, 4 Drawing Sheets

SYSTEMS FOR COMPRESSING A GAS

BACKGROUND OF THE INVENTION

The subject matter disclosed herein relates to systems and methods for compressing a gas, such as a carbonous gas, in a power plant.

Fossil fuels, such as coal or petroleum, may be gasified for use in the production of electricity, chemicals, synthetic fuels, or for a variety of other applications. Gasification involves reacting a carbonaceous fuel and oxygen at a very high temperature to produce syngas, i.e., a fuel containing carbon monoxide and hydrogen, which burns much more efficiently and cleaner than the fuel in its original state. Gasification operations may result in the creation of carbon dioxide ($CO_2$), which is greenhouse gas. Accordingly, systems and methods for efficiently handling and storing the $CO_2$ would be beneficial.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a first compressor configured to compress a carbonous gas and a controller. The controller is configured to control the first compressor to transition from compressing a first carbonous gas to compressing a second carbonous gas during startup of a gasification system.

In a second embodiment, a system includes a compressor configured to compress a carbonous gas and a controller. The controller is configured to control a flow of a carbonous gas to the compressor. The controller is configured to transition between a first source of the carbonous gas during a startup period and a second source of the carbonous gas during a steady state period.

In a third embodiment, a system includes a first source of $CO_2$, a second source of $CO_2$ comprising a $CO_2$ capture system, a compression system, and a controller. The compression system is coupled to the first and second sources of CO2. The controller is configured to start up operations of the compression system with a first flow of $CO_2$ from the first source and transition to steady state operations of the compression system using a second flow of $CO_2$ from the second source of $CO_2$.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for utilizing carbonous gas (e.g., $CO_2$) from different sources, for example, an enhanced oil recovery (EOR) pipeline, as a gas used to start gas compression operations. Power plants, for example, an integrated gasification combined cycle (IGCC) power plant described in more detail with respect to FIG. 1 below, may use gas compressors to compress $CO_2$ being captured during syngas treatment. In other words, the captured $CO_2$ is available during operation of a gasifier, and gas treatment equipment. The captured $CO_2$ may be compressed and dehydrated so as to be more efficiently transported to a carbon sequestration facility or to an oil well.

A different startup gas, such as nitrogen, may replace captured $CO_2$ during plant startup and may be used to start compression operations. However, nitrogen has a different molecular weight as $CO_2$ and limits the compressor discharge pressures, produces certain detrimental effects in systems such as gas dehydration systems, and is more expensive. Further, using nitrogen for startup operations of a gas compression system, such as the $CO_2$ compression system depicted in FIG. 2, results in delays due to the transitioning from the startup nitrogen to the captured $CO_2$ produced during normal plant operations. Such delays may also lead to higher startup emissions of $CO_2$ and sulfur rich gases, because the gases produced by plant operations during the transition period may not be subsequently compressed and/or dehydrated. Accordingly, the disclosed embodiments use $CO_2$ as a startup gas during compressor startup operations by redirecting $CO_2$ from other sources, and subsequently use captured $CO_2$ produced by the plant during normal compressor operation.

Figure 1:
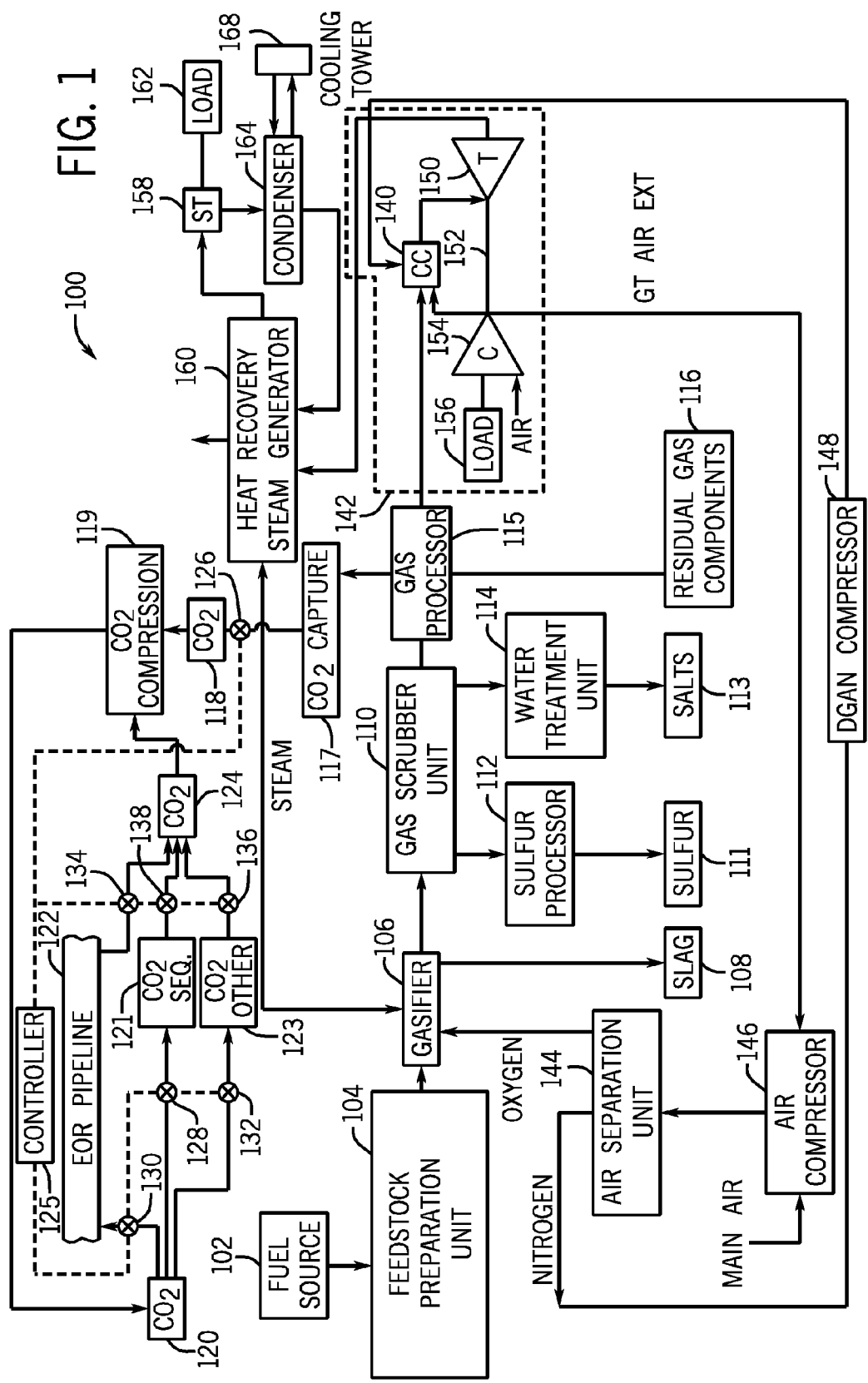
FIG. 1 depicts a block diagram of an embodiment of an integrated gasification combined cycle (IGCC) power plant, including a gas compression system.

With the foregoing in mind, FIG. 1 depicts an embodiment of an IGCC power plant 100 that may produce and burn a synthetic gas, i.e., syngas. Elements of the IGCC power plant 100 may include a fuel source 102, such as a solid feed, that may be utilized as a source of energy for the IGCC power plant 100. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In certain embodiments, no liquid is added to the fuel source, thus yielding dry feedstock. The feedstock may be conveyed into a gasifier 106 for use in gasification operations.

The gasifier 106 may convert the feedstock into a syngas, e.g., a combination of carbon monoxide and hydrogen. This conversion may be accomplished by subjecting the feedstock to a controlled amount of any moderator and limited oxygen at elevated pressures (e.g., from approximately 600 pounds per square inch gauge (PSIG)-1200 PSIG) and elevated temperatures (e.g., approximately 2200° F.-2700° F.), depending on the type of feedstock used. The heating of the feedstock during a pyrolysis process may generate a solid (e.g., char) and residue gases (e.g., carbon monoxide, hydrogen, and nitrogen).

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 2200° F. to approximately 2700° F. In addition, steam may be introduced into the gasifier 106. The gasifier 106 utilizes steam and limited oxygen to allow some of the feedstock to be burned to produce carbon monoxide and energy, which may drive a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed untreated syngas, since it contains, for example, $H_2S$. The gasifier 106 may also generate waste, such as slag 108, which may be a wet ash material. This slag 108 may be removed from the gasifier 106 and disposed of, for example, as road base or as another building material. To treat the untreated syngas, a gas scrubber 110 may be utilized. In one embodiment, the gas scrubber 110 may be a water gas shift reactor. The gas scrubber 110 may scrub the untreated syngas to remove the HCl, HF, COS, HCN, and $H_2S$ from the untreated syngas, which may include separation of sulfur 111 in a sulfur processor 112 by, for example, an acid gas removal process in the sulfur processor 112. Furthermore, the gas scrubber 110 may separate salts 113 from the untreated syngas via a water treatment unit 114 that may utilize water purification techniques to generate usable salts 113 from the untreated syngas. Subsequently, the gas from the gas scrubber 110 may include treated syngas, (e.g., the sulfur 111 has been removed from the syngas), with trace amounts of other chemicals, e.g., $NH_3$ (ammonia) and $CH_4$ (methane).

A gas processor 115 may be used to remove additional residual gas components 116, such as ammonia and methane, as well as methanol or any residual chemicals from the treated syngas. However, removal of residual gas components from the treated syngas is optional, since the treated syngas may be utilized as a fuel even when containing the residual gas components, e.g., tail gas. At this point, the treated syngas may include approximately 3% CO, approximately 55% $H_2$, and approximately 40% $CO_2$ and is substantially stripped of $H_2S$.

In some embodiments, a carbon capture system 117 may extract and process the carbonous gas (e.g., $CO_2$ that is approximately 80-100 percent or 90-100 percent pure by volume) contained in the syngas. An extracted $CO_2$ 118 may then be transferred into a gas compression system 119. In certain embodiments, the gas compression system 119 may compress, dehydrate, and liquefy the extracted $CO_2$ 118, resulting in a $CO_2$ 120 that is more easily transported and stored. The $CO_2$ 120 may then be redirected into a carbon sequestration system 121, an EOR pipeline 122, and/or other sources of $CO_2$ 123 (e.g., storage tanks) for use in, for example, oil recovery activities. Accordingly, emissions of the extracted $CO_2$ 118 into the atmosphere may be reduced or eliminated by redirecting the extracted $CO_2$ 118 for use in such activities.

When starting the operations for the gas compression system 119, it may be beneficial to use a $CO_2$ gas instead of a gas with a different molecular weight such as nitrogen. Accordingly, sources of $CO_2$ such as the EOR pipeline 122, the carbon sequestration system 121, and/or other sources of $CO_2$ 123, may be used to provide a startup $CO_2$ 124. The startup $CO_2$ 124 may then be used in the startup operations of the gas compression system 119 as described in more detail with respect to FIGS. 2, 3, and 4 below. Thus, in the illustrated embodiments, a $CO_2$ controller 125 may direct the transfer of the various $CO_2$ flows through the use of, for example, valves 126, 128, 130, 132, 134, 136, and 138.

Valve 126 is used to adjust (e.g., increase or decrease) the $CO_2$ flow 118 from the carbon capture system 117 to the gas compression system 119. Valve 128 is used to adjust the $CO_2$ flow 120 from the gas compression system 119 to the carbon sequestration system 121. Valve 130 is used to adjust the $CO_2$ flow 120 from the gas compression system 119 to the EOR pipeline 122. Valve 132 is used to adjust the $CO_2$ flow 120 from the gas compression system 119 to other $CO_2$ sources 123, for example, $CO_2$ storage tanks. Consequently, a compressed and dehydrated $CO_2$ 120 may be delivered for use in, for example, oil recovery activities.

As mentioned above, using startup $CO_2$ is advantageous for startup operations of the $CO_2$ compression system. Accordingly, the startup $CO_2$ flow 124 may be attained by including $CO_2$ flows from sources such as the EOR pipeline 122, the carbon sequestration system 121, and/or the other $CO_2$ sources 123. Thus, the $CO_2$ controller 125 may adjust, for example, valve 134 to adjust the flow of $CO_2$ 124 from the EOR pipeline 122 to the gas compression system 119. Valve 136 may be used to adjust the $CO_2$ flow 124 from the carbon sequestration system 121 to the gas compression system 119. Valve 138 may be used to adjust the $CO_2$ flow 124 from the other sources of $CO_2$ 123, such as storage tanks, to the gas compression system 119. The startup $CO_2$ 124 may then be used during plant startup operations, including gas compression system 119 startup operations, as described in more detail with respect to FIGS. 2, 3, and 4 below.

Continuing with the syngas processing, once the $CO_2$ has been captured from the syngas, the treated syngas may be then transmitted to a combustor 140, e.g., a combustion chamber, of a gas turbine engine 142 as combustible fuel. The IGCC power plant 100 may further include an air separation unit (ASU) 144. The ASU 144 may operate to separate air into component gases by, for example, distillation techniques. The ASU 144 may separate oxygen from the air supplied to it from a supplemental air compressor 146, and the ASU 144 may transfer the separated oxygen to the gasifier 106. Additionally the ASU 144 may transmit separated nitrogen to a diluent nitrogen (DGAN) compressor 148.

The DGAN compressor 148 may compress the nitrogen received from the ASU 144 at least to pressure levels equal to those in the combustor 140, so as not to interfere with the proper combustion of the syngas. Thus, once the DGAN compressor 148 has adequately compressed the nitrogen to a proper level, the DGAN compressor 148 may transmit the compressed nitrogen to the combustor 140 of the gas turbine engine 142. The nitrogen may be used as a diluent to facilitate control of emissions, for example.

As described previously, the compressed nitrogen may be transmitted from the DGAN compressor 148 to the combustor 140 of the gas turbine engine 142. The gas turbine engine 142 may include a turbine 150, a drive shaft 152 and a compressor 154, as well as the combustor 140. The combustor 140 may receive fuel, such as syngas, which may be injected under pressure from fuel nozzles. This fuel may be mixed with compressed air as well as compressed nitrogen from the DGAN compressor 148, and combusted within combustor 140. This combustion may create hot pressurized exhaust gases.

The combustor 140 may direct the exhaust gases towards an exhaust outlet of the turbine 150. As the exhaust gases from the combustor 140 pass through the turbine 150, the exhaust gases force turbine blades in the turbine 150 to rotate the drive shaft 152 along an axis of the gas turbine engine 142. As illustrated, the drive shaft 152 is connected to various components of the gas turbine engine 142, including the compressor 154.

The drive shaft 152 may connect the turbine 150 to the compressor 154 to form a rotor. The compressor 154 may include blades coupled to the drive shaft 152. Thus, rotation of turbine blades in the turbine 150 may cause the drive shaft 152 connecting the turbine 150 to the compressor 154 to rotate blades within the compressor 154. This rotation of blades in the compressor 154 causes the compressor 154 to compress air received via an air intake in the compressor 154. The compressed air may then be fed to the combustor 140 and mixed with fuel and compressed nitrogen to allow for higher efficiency combustion. Drive shaft 152 may also be connected to load 156, which may be a stationary load, such as an electrical generator for producing electrical power, for example, in a power plant. Indeed, load 156 may be any suitable device that is powered by the rotational output of the gas turbine engine 142.

The IGCC power plant 100 also may include a steam turbine engine 158 and a heat recovery steam generation (HRSG) system 160. The steam turbine engine 158 may drive a second load 162. The second load 162 may also be an electrical generator for generating electrical power. However, both the first and second loads 156, 162 may be other types of loads capable of being driven by the gas turbine engine 142 and steam turbine engine 158. In addition, although the gas turbine engine 142 and steam turbine engine 158 may drive separate loads 156 and 162, as shown in the illustrated embodiment, the gas turbine engine 142 and steam turbine engine 158 may also be utilized in tandem to drive a single load via a single shaft. The specific configuration of the steam turbine engine 158, as well as the gas turbine engine 142, may be implementation-specific and may include any combination of sections.

The system 100 may also include the HRSG 160. Heated exhaust gas from the gas turbine engine 142 may be transported into the HRSG 160 and used to heat water and produce steam used to power the steam turbine engine 158. Exhaust from, for example, a low-pressure section of the steam turbine engine 158 may be directed into a condenser 164. The condenser 164 may utilize a cooling tower 168 to exchange heated water for chilled water. The cooling tower 168 acts to provide cool water to the condenser 164 to aid in condensing the steam transmitted to the condenser 164 from the steam turbine engine 158. Condensate from the condenser 164 may, in turn, be directed into the HRSG 160. Again, exhaust from the gas turbine engine 142 may also be directed into the HRSG 160 to heat the water from the condenser 164 and produce steam.

In combined cycle power plants such as IGCC power plant 100, hot exhaust may flow from the gas turbine engine 142 and pass to the HRSG 160, where it may be used to generate high-pressure, high-temperature steam. The steam produced by the HRSG 160 may then be passed through the steam turbine engine 158 for power generation. In addition, the produced steam may also be supplied to any other processes where steam may be used, such as to the gasifier 106. The gas turbine engine 142 generation cycle is often referred to as the "topping cycle," whereas the steam turbine engine 158 generation cycle is often referred to as the "bottoming cycle." By combining these two cycles as illustrated in FIG. 1, the IGCC power plant 100 may lead to greater efficiencies in both cycles. In particular, exhaust heat from the topping cycle may be captured and used to generate steam for use in the bottoming cycle.

Figure 2:
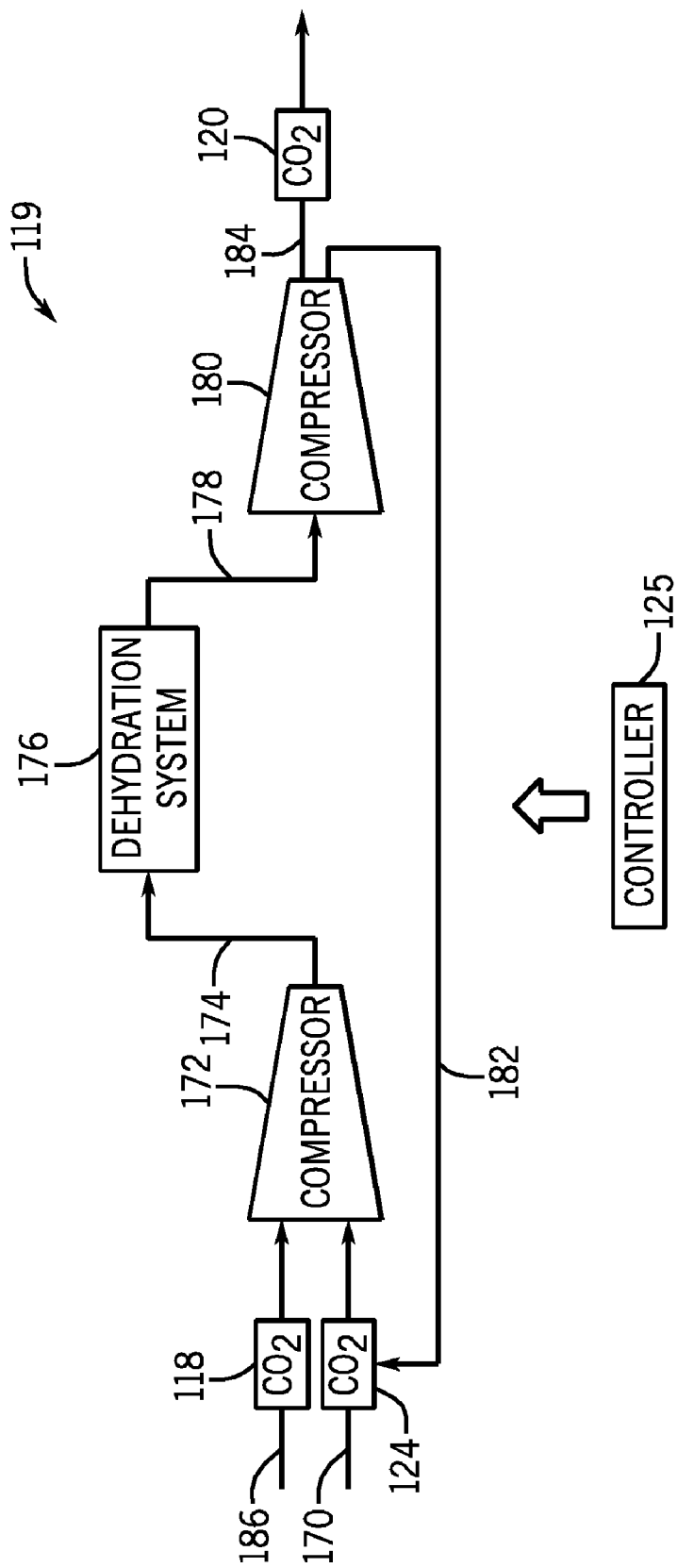
FIG. 2 depicts a block diagram of an embodiment of the gas compression system depicted in FIG. 1.

FIG. 2 is a diagram of an embodiment of a gas compression system 119 that may be controlled by the $CO_2$ controller 125, for example, to compress and dehydrate $CO_2$. Compressing the $CO_2$ is advantageous because the compression can yield a liquid $CO_2$. The liquid $CO_2$ may then be transported more easily, by using, for example, more efficient liquid pumps and liquid transmission conduits. Water removal (i.e., dehydration) of the $CO_2$ is advantageous because a lower water moisture content of the $CO_2$ helps in the prevention of corrosion in conduits as well as in surfaces, such as the inside of a storage tank, that come in contact with the water. The reclaimed water may also be recycled, thus further reducing the need for raw water. In certain embodiments, such as the depicted embodiment, the gas compression system 119 includes two stages of compression. In other embodiments, the gas compression system 119 may include three, four, five, six, seven, eight stages of compression. In yet other embodiments, the gas compression system 119 includes a single stage of compression. Indeed, any number of compression stages may be used to compress the $CO_2$.

During the startup phase of the gas compression system 119, the controller can use the startup $CO_2$ 124. Accordingly, a conduit 170 transfers the flow of the startup $CO_2$ 124 from sources such as the carbon sequestration system 121, the EOR pipeline 122, and other $CO_2$ sources 123, into a first stage compressor 172, as illustrated. It is to be understood that in embodiments when the startup $CO_2$ 124 is delivered from multiple sources (e.g., the carbon sequestration system 121, EOR pipeline 122, other $CO_2$ sources 123), the combining of startup $CO_2$ 124 may include the use of components such as pressure regulators, mixing tanks, compressors, heaters, chillers, and so forth that allow for the combination of gases that may have different flow rates, pressures, and temperatures. The $CO_2$ 124 transferred to the compressor 172 may be approximately 60%-70%, 70%-80%, 80%-90%, 90%-100% pure by volume. In certain embodiments, the compressor 172 may include an axial flow compressor, a centrifugal compressor, a reciprocating compressor, and/or a rotary compressor. Indeed, any compressor capable of compressing a gas, such as $CO_2$, may be used. The compressor 172 is capable of raising the pressure of the $CO_2$ 124 from an approximately near atmospheric pressure to a pressure upwards of approximately 100 pounds per square inch atmospheric (PSIA), 400 PSIA, 500 PSIA, 600 PSIA, 700 PSIA, at a temperature range of approximately 50° F.-300° F., 100° F.-300° F., 250° F.-300° F.

The $CO_2$ flow compressed by the compressor 172 may then be transferred to a dehydration system 176 by using, for example, a conduit 174. The dehydration system 176 is capable of removing water from the incoming $CO_2$ flow. Accordingly, the dehydration system 176 may use techniques such, diethylene glycol (DEG) dehydration, triethylene glycol (TEG) dehydration, silica gel dehydration, silica-alumina gel dehydration, direct cooling, molecular sieves, and so forth, to dehydrate the $CO_2$ flow. The $CO_2$ flow exiting the dehydration system 176 may only contain a water content of approximately 1, 4, 8, 20, 50 pounds per million standard cubic feet (lb/MMSCF).

A conduit 178 directs the flow of dehydrated $CO_2$ into a second stage compressor 180. In certain embodiments, the second stage compressor 180 may include an axial flow compressor, a centrifugal compressor, a reciprocating compressor, and/or a rotary compressor. Indeed, any compressor capable of compressing a gas, such as $CO_2$, may be used. The compressor 180 is capable of raising the pressure of the dehydrated $CO_2$ to a pressure of approximately 1800 PSIA-2400 PSIA, 2400 PSIA-2700 PSIA, at a temperature range of approximately 100° F.-600° F., 250° F.-600° F. Accordingly, the second stage compressor 180 is capable of causing a phase change in the $CO_2$ from a gaseous phase into a liquid phase.

During plant 100 startup operations, the flow of startup $CO_2$ 124 may continue until a sufficient volume of the extracted $CO_2$ 118 becomes available. In certain embodiments, a conduit 182 may redirect the startup $CO_2$ 124 from the compressor 180 to the compressor 172. Indeed, the conduit 182 may be used to create a first startup cycle that is able to start up compression operations of the gas compression system 119. The first startup cycle uses the startup $CO_2$ 124 as a gas to initiate operations of the compressor 172, the dehydration system 176, and the compressor 180. In certain embodiments of the first startup cycle (i.e., transferring $CO_2$ 124 through the conduit 182), the compressor 180 may not compress the $CO_2$ 124 to a liquid phase. In these embodiments, the controller 125 waits until extracted $CO_2$ 118 is available before liquefying the extracted $CO_2$ 118, thus saving energy. In other embodiments of the first startup cycle, the controller 125 may control the compressor 180 so as liquefy the startup $CO_2$ 124. The controller 125 may subsequently reduce the pressure of the $CO_2$ 124, for example, by using a pressure reducer, before transferring the $CO_2$ 124 back to the compressor 172. In these embodiments, the full capabilities of all the systems in the gas compression system 119, including liquefaction capabilities, can be tested by using the startup $CO_2$ 124 before the extracted $CO_2$ 118 is used.

In certain embodiments, a second startup cycle includes the use of a conduit 184. In these embodiments, the startup $CO_2$ 124 may be compressed and liquefied into $CO_2$ 120, and transferred through the conduit 184. As mentioned above with respect to FIG. 1, the compressed and liquefied $CO_2$ 120 can be transferred back into the carbon sequestration system 121, the EOR pipeline 122, or other $CO_2$ sources 123, such as storages tanks. In this second start up cycle, the startup $CO_2$ 124 is compressed, dehydrated, and liquefied, and then redirected through the conduit 184 back to one of the aforementioned sources 121, 122, and/or 123 of $CO_2$. The sources 121, 122, and/or 123 of $CO_2$ may then redirect startup $CO_2$ 124 back to the gas compression system 119 for use in startup operations.

In other embodiments of the first and the second startup cycles, the extracted $CO_2$ 118 may be used in combination with the startup $CO_2$ 124 or in lieu of the startup $CO_2$ 124. In these embodiments, the extracted $CO_2$ 118 may have begun to be produced before the gas compression system 119 has finished starting up. Accordingly, a conduit 186 may be used to redirect the extracted $CO_2$ 118 to the compression system 119. In these embodiments, the controller 125 is capable of combining the startup $CO_2$ 124 with the extracted $CO_2$ 118 and using the combined $CO_2$ flow to start up the gas compression system 119. The combined $CO_2$ flow would enter the compression stages 172, 180 and be dehydrated by the dehydration system 180 in a comparable startup process to the startup process that uses the startup $CO_2$ flow 124 as mentioned above. The controller 125 is capable of adjusting the combined flow of $CO_2$ so as to use as much of the extracted $CO_2$ 118 as may be possible. Indeed, it may be possible to coordinate the start of operations of the compression system 119 and with the start of gasification operations so that all of the extracted $CO_2$ 118 being produced is compressed and redirected to the various $CO_2$ sources 121, 122, and 123. In other words, the controller 125 may be configured to coordinate the flow rates of startup $CO_2$ 124 and extracted $CO_2$ 118, such that the flow rate of $CO_2$ 124 gradually decreases while the flow rate of $CO_2$ 118 gradually increases.

Once the gas compression system 119 reaches steady state operations (i.e., normal operations), the gas compression system 119 is capable of receiving all of the extracted $CO_2$ flow 118 being produced by steady state operations of the gasification plant 100. Consequently, the extracted $CO_2$ 118 may then be compressed by the first stage compressor 172. The first stage compressor 172 can increase the pressure of the $CO_2$ flow 118 from an approximately near atmospheric pressure to a pressure upwards of approximately 100 PSIA, 400 PSIA, 500 PSIA, 600 PSIA, 700 PSIA, at a temperature range of approximately 50° F.-300° F., 100° F.-300° F., 250° F.-300° F. The first stage compressor 172 is able to more quickly compress the extract $CO_2$ 118 because the first stage compressor 172 is now running continuously.

The compressed extract $CO_2$ 118 may then be redirected into the dehydration system 176 through the use of conduit 174. The dehydration system 176 is also running continuously during steady state operations, and is capable of removing water from the incoming extract $CO_2$ flow 118. Accordingly, the extract $CO_2$ flow 118 exiting the dehydration system 176 through, for example, the conduit 178 may only contain a water content of approximately 1, 4, 8, 20, 50 lb/MMSCF. The conduit 178 directs the flow of the dehydrated extract $CO_2$ 118 into the second stage compressor 180. The second stage compressor 180 is running continuously, and is able to compress the dehydrated extract $CO_2$ 118 to a pressure of approximately 1800 PSIA-2400 PSIA, 2400 PSIA-2700 PSIA, at a temperature range of approximately 100° F.-600° F., 250° F.-600° F. Consequently, the extract $CO_2$ 118 may undergo a phase change from a gas into a liquid phase. The resulting liquefied $CO_2$ 120 may then be redirected to the carbon sequestration system 121, the EOR pipeline 122, and/or other sources of $CO_2$ 123. Indeed, future flows of extract $CO_2$ 118 being produced by the gasification operations may be compressed, dehydrated and liquefied by the gas compression system 119, and subsequently redirected to one of the aforementioned sources 121, 122, and/or 123 of $CO_2$.

By using the startup $CO_2$ 124 and/or extracted $CO_2$ 118 instead of nitrogen to start up operations of the gas compression system 119, the same type of gas may be used during startup and normal operations. Accordingly, the gas compression system 119 may experience a smoother transition to using the extract $CO_2$ 118 because compressor surge (e.g., rapid pulsations in the gas flow) is minimized, the dehydration system 176 is able to reach a steady state more quickly, and controller modalities can be configured to control a single type of gas (e.g., $CO_2$). Such a smooth transition may result in the elimination of transition delays, thus avoiding the emission of $CO_2$ into the atmosphere during plant startup.

Figure 3:
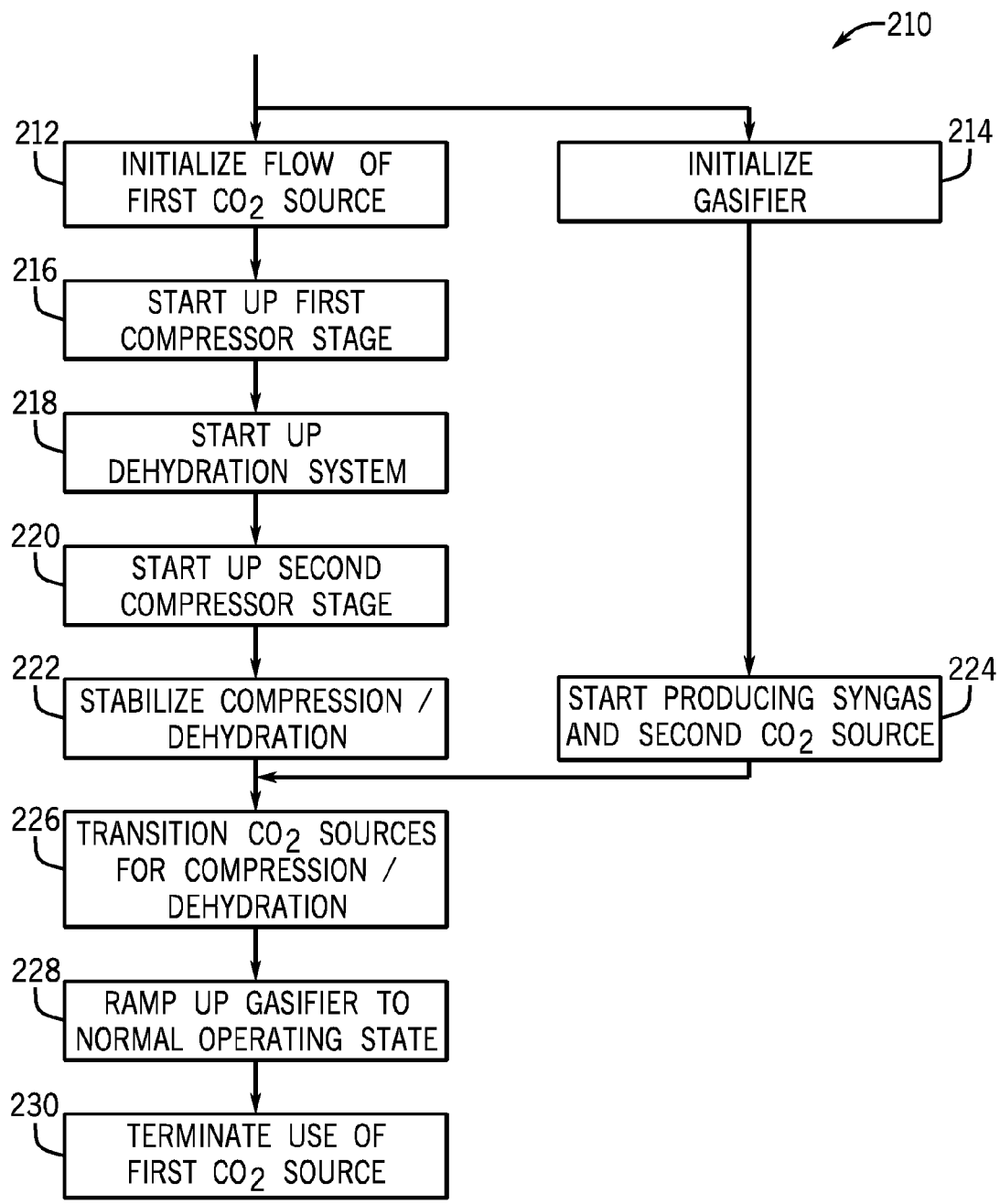
FIG. 3 is a flowchart of a method of transitioning between startup and steady state operation of a gas compression system; and, FIG. 4 is a graph of a transition from a first $CO_2$ source to a second $CO_2$ source for compressing a gas.

FIG. 3 is a flowchart of an embodiment of a computer-implemented method 210 that may be used, for example, by the $CO_2$ controller 125 of FIGS. 1 and 2, to start up gas compression operations and to transition into compressing the extract $CO_2$ 118. More specifically, the method 210 details a process that may be employed, for example by the controller 125, when starting the compression process by using a first carbonous gas (e.g., $CO_2$) source and consequently transitioning to the use of second carbonous gas (e.g., $CO_2$) source as a compressed gas that may be delivered to various sources 121, 122, and 123 of $CO_2$. Accordingly, each block of the method 210 may include machine readable code or computer instructions that can be executed by the controller 125. In certain embodiments, the first source of carbonous carrier gas is always available and the second source of carbonous carrier gas is only available during operation of the gasifier. In embodiments where the first and second source of carbonous gas is $CO_2$ gas, the first $CO_2$ source may include the sources of startup $CO_2$ 124 as illustrated in FIGS. 1 and 2. As mentioned above with respect to FIG. 1, startup $CO_2$ 124 may be reused from a plurality of locations such as the carbon sequestration 121, the EOR pipeline 122, and/or some other $CO_2$ source 123. The use of startup $CO_2$ 124 as the first gas used during compression startup operations may be advantageous because it may allow for the same type of carrier gas (e.g., $CO_2$) to be employed throughout the plant's operational cycle from startup through normal operations and shutdown. Accordingly, the same types of compression control modalities, dehydration modalities, and so forth, can be reused and need not be changed to conform to a different startup gas (e.g., nitrogen).

The method 210 may begin by initializing a flow of the first $CO_2$ source (block 212). The flow of the first $CO_2$ source may include using a single source such as the EOR pipeline 122 or a combination of sources of $CO_2$ such as the EOR pipeline 122 combined with the carbon sequestration system 121. Indeed, any sources of startup $CO_2$ 124 may be combined or used individually as the first $CO_2$ source that delivers the $CO_2$ needed to start up gas compression operations. In certain embodiments, for example embodiments that start up both compression operations as well as gasification operations, the gasifier 106 is also initialized (block 214). It is to be understood that the initialization of the gasifier 106 may occur at approximately the same time as the initialization of the flow of the first $CO_2$ source (block 212), before the initialization of the flow of the first $CO_2$ source (block 212), or after the initialization of the flow of the first $CO_2$ source (block 212). The gasifier 106 may be initialized, for example, by delivering fuel to the gasifier 106 for gasification of the fuel.

After the flow of the first source of $CO_2$ has been initialized, the flow of the first source of $CO_2$ may be used to start up a first compression stage (block 216), for example, the first compressor 172 illustrated in FIG. 2. In one embodiment, the first compressor 172 is turned on and a conduit 170 is used to deliver the flow of the first source of $CO_2$ to the first compressor 172. In this embodiment, the first compressor 172 compresses the flow of the first source of $CO_2$ until the $CO_2$ flow reaches a certain compression value, for example, a value of approximately 100 PSIA, 400 PSIA, 500 PSIA, 600 PSIA, 700 PSIA, at a temperature range of approximately 50° F.-300° F., 100° F.-300° F., 250° F.-300° F.

Once the $CO_2$ flow reaches a certain compression value, the compressed flow of the first source of $CO_2$ may be redirected and used to start up operations of a dehydration system (block 218), such as the dehydration system 176. The dehydration system startup may include the startup of subsystems such as a TEG dehydrator, a DEG dehydrator, a molecular sieve, and so forth. The start up of the dehydration system 176 may continue until the flow of the first $CO_2$ source reaches a water level of, for example, approximately 1, 4, 8, 20, 50 lb/MMSCF.

Once the $CO_2$ flow reaches a certain water level, the $CO_2$ flow may be used to start up operations of a second compressor stage (block 220), for example, the second stage compressor 180. In one embodiment, the compressor 180 is turned on and the conduit 178 is used to deliver the flow of the first source of $CO_2$ into the second compressor 180. In this embodiment, the second compressor 180 then begins to compress the flow of the first source of $CO_2$. The compression and dehydration operations may then be stabilized (block 222), for example, by redirecting the compressed flow of the first $CO_2$ source from the second stage compressor 180 to the first stage compressor 172. By using a compression/dehydration cycle, a constant, even flow of $CO_2$ may be realized. The compression/dehydration cycle aids in advantageously creating a constant, stable flow by supporting the smooth startup of the subsystems (e.g., compressors, dehydrators, pressure regulators) of the gas compression system 119.

Initially, approximately 100% of the $CO_2$ that may be used for compression and dehydration operations may be directed from the first $CO_2$ source. As the gasifier begins gasification and starts producing syngas, IGCC power plant components may then use the resulting syngas to produce $CO_2$ as a second $CO_2$ source (block 224). The second $CO_2$ source may include, for example, the carbon capture system 117 of FIG. 1. It is to be understood that while the production of syngas and the second $CO_2$ source occurs after the initialization of the gasifier (block 214), the production of syngas and the second $CO_2$ source (block 224) may occur before block 222. Accordingly, other embodiments of the method 210 may be able to use the second $CO_2$ source to stabilize the compression/dehydration cycle (block 222), for example, or to start up operations of the various components of the compression system 119 (blocks 216, 218, 220). In the depicted embodiment, the second $CO_2$ source becomes available after block 222. Accordingly, a transition to the compression and dehydration of the second $CO_2$ source (block 226) is depicted as occurring after block 222 but may occur anytime after block 212.

During the transition of the $CO_2$ sources (226), more syngas becomes available through gasification activities. Accordingly, the method 210 transitions from using the first $CO_2$ source (e.g., startup $CO_2$ 124) to using the second $CO_2$ source (e.g., extracted $CO_2$ 118) to replace some of the first $CO_2$ as the compression and dehydration gas. In one embodiment, the $CO_2$ controller 125 may control a set of valves to combine both startup $CO_2$ 124 as well as extracted $CO_2$ 118 so that they both are used as the compressed and dehydrated gas as previously described with respect to FIG. 2. As sensors indicate more availability of the extracted $CO_2$ 118, the $CO_2$ controller 125 may redirect more extracted $CO_2$ 118 and less startup $CO_2$ 124 to be used as the compression and dehydration gas. It is to be understood that the combining of startup $CO_2$ 124 with extracted $CO_2$ 118 may include the use of components such as pressure regulators, mixing tanks, compressors, heaters, chillers, and so forth that allow for the combination of gases that may have different flow rates, pressures, and temperatures.

As the gasifier and the remainder of the power plant ramp up to normal operations (block 228), more quantities of syngas, and consequently more quantities of the second $CO_2$ may be produced. Accordingly, the method 210 may redirect more quantities of the second $CO_2$ and less quantities of the first $CO_2$ into the compression and dehydration process until approximately 100% of the compressed and dehydrated gas may be the second $CO_2$. When the second $CO_2$ reaches a desired percentage, e.g., 100%, then the first $CO_2$ may no longer be used as a source of $CO_2$ (block 230). Accordingly, emissions of the second $CO_2$ may be completely eliminated by redirecting the second $CO_2$ into the compression and dehydration process. As mentioned previously, the compressed and dehydrated $CO_2$ may be subsequently directed to the carbon sequestration system 121, the EOR pipeline 122, and/or other $CO_2$ sources, for use in, for example, oil recovery activities.

Figure 4:
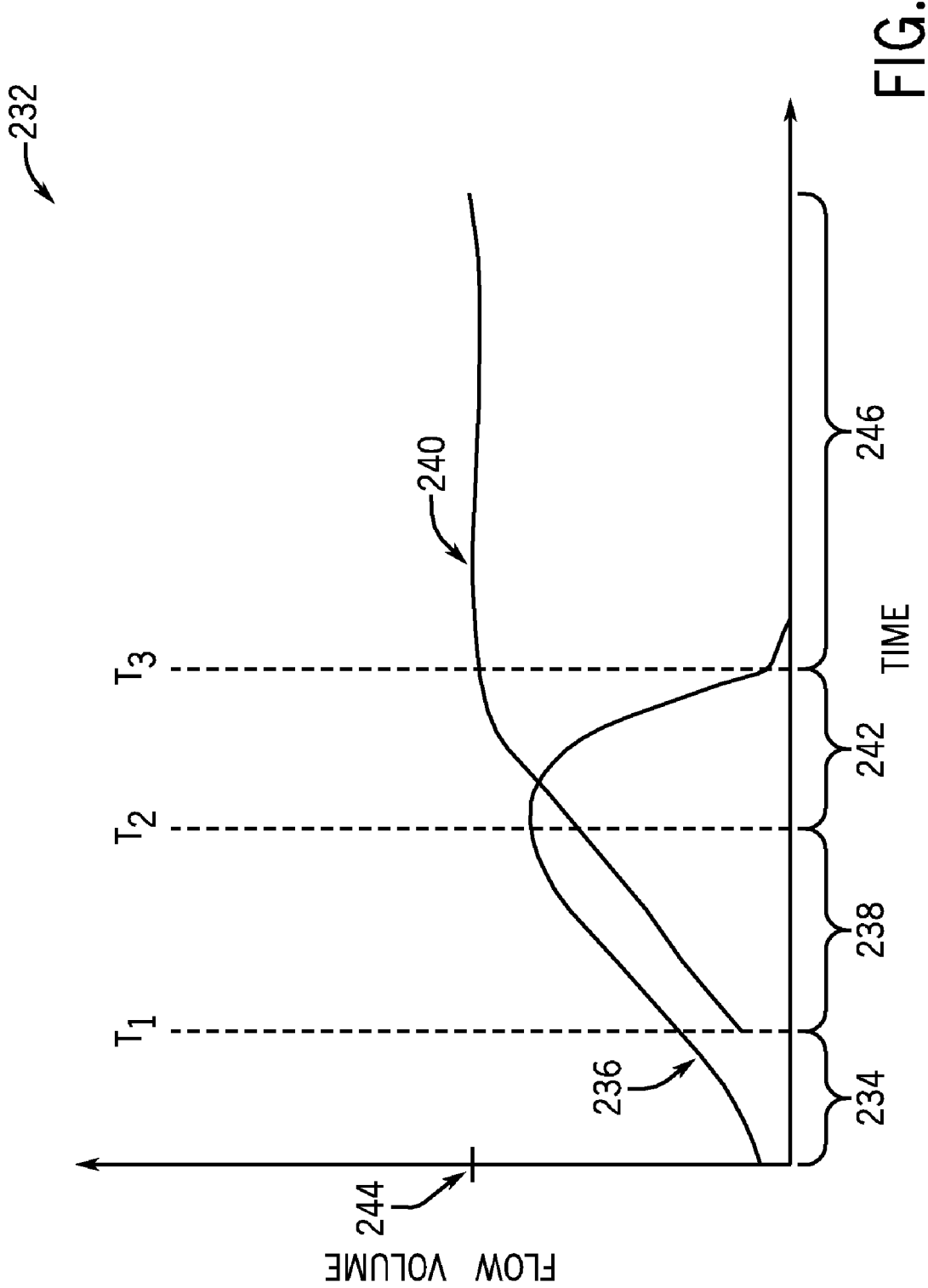

FIG. 4 is a graph of an embodiment of a $CO_2$ transition model 232 that may be used to transition from a first $CO_2$ (e.g., startup $CO_2$ 124) to a second $CO_2$ (e.g., extracted $CO_2$ 118) as the gas to be compressed and dehydrated by the gas compression system 119. The ordinate (i.e., y-axis) of the graph represents flow rates of the first $CO_2$ and the second $CO_2$. The abscissa (i.e. x-axis) represents time. As described above with respect to FIG. 3, the first $CO_2$ source (e.g., $CO_2$ 124), may be used as the startup source of $CO_2$ to initialize compression operations, for example, during IGCC plant 100 startup. A second $CO_2$ (e.g., $CO_2$ 118) may then be used to transition from startup operations to normal operations.

In an initialization period 234, the controller 125 may start a flow 236 of the first $CO_2$ as the gas compression system 119 begins the startup process. The flow 236 may be incrementally compressed and dehydrated during the compression system's start up process. As the gas compression system 119 continues the startup process, increasing quantities of the first $CO_2$ flow 236 can be used.

In certain embodiments, the controller 125 may then enter a first transition period 238 where a flow 240 of the second $CO_2$ may be added to the flow 236 of the first $CO_2$. The transition period may begin at a certain time $T_1$, for example, when the extracted $CO_2$ 118 produced by gasification operations becomes available. As gasification operations produce increasing quantities of the second $CO_2$ 240, the controller 125 may augment the flow rate of the second $CO_2$ flow 240. Accordingly, the combination of the flow rate 236 with the flow rate 240 is used to continue startup operations. At a time $T_2$, the controller 125 may enter a second transition period 242. During the second transition period, the combined flow of first and second $CO_2$ sources 236, 240, is capable of starting up the compression and dehydration operations. Accordingly, the first $CO_2$ flow 236 may be reduced as increasing quantities of the second $CO_2$ flow 240 become available during gasification operations. The process of reducing the flow 236 of the first $CO_2$ and augmenting the flow 240 of the second $CO_2$ may then continue until gasification operations produce sufficient volumes of the second $CO_2$ so as to attain a steady state (i.e., normal operations) flow level 244 at a time $T_3$.

At the steady state flow level 244, the source of the first $CO_2$ 236 can be turned off and the compression and dehydration operations may then continue to operate by using the second $CO_2$ 240. Consequently, a steady state operations period 246 of the graph depicts the use of the second $CO_2$ flow 240 as the main $CO_2$ flow used in compression and dehydration operations. It is to be understood that the embodiments disclosed herein allow for many variations of a $CO_2$ transition model, such as the example $CO_2$ transition model 232, to be used. Indeed, the level 244 may be lower or higher, and the upward and downward curves of the flow rates 236, 240 may adjusted, for example, to have different slopes so as to more efficiently and economically transition from a first $CO_2$ gas to a second $CO_2$ gas through a wide variety of power plant 100 operations and gas compression system 119 embodiments.

Technical effects of the invention include the ability to smoothly transition from a startup $CO_2$ gas used to start compression operations to an extracted $CO_2$ gas, which may be used to continue normal compression operations. Accordingly, $CO_2$ emissions caused by plant operations may be reduced or eliminated. Sources of the startup $CO_2$ carrier gas may include an enhanced oil recovery pipeline, a carbon sequestration system, and others such as $CO_2$ storage tanks. Sources of an extracted $CO_2$ carrier gas include a carbon capture system. Further effects include the ability to simplify compression and dehydration operations by using the same type of gas for startup as well as for normal operations. Accordingly, gas compression and dehydration systems may experience a smoother transition to compressing a second gas source because compressor surge (e.g., rapid pulsations in the gas flow) is minimized, the dehydration systems are able to reach a steady state more quickly, and controller modalities can be configured to control a single type of gas (e.g., $CO_2$). Controller modalities may use computer instructions to quickly and efficiently transition between the gas sources.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising: a gasification system configured to produce a syngas; a first compressor configured to compress $CO_2$; and a controller configured to control the first compressor to transition from compressing a first source of $CO_2$ to compressing a second source of $CO_2$ during startup of a gasification system, wherein the second source of $CO_2$ is captured from the syngas produced by the gasification system during the transition, and the first source of $CO_2$ is not captured from the syngas produced during the transition.

2. The system of claim 1, wherein the first source of $CO_2$, the second source of $CO_2$ or both, comprises carbon dioxide that is at least approximately 80 percent pure by volume.

3. The system of claim 1, comprising a gas treatment system.

4. The system of claim 1, wherein the transition begins during startup and ends during steady state operations of the gasification system.

5. The system of claim 1, comprising a carbon capture system having the first compressor and the controller, wherein the second source of the $CO_2$ comprises the carbon capture system.

6. The system of claim 1, wherein the first source of the $CO_2$ comprises at least one of an enhanced oil recovery (EOR) pipeline, a carbon sequestration system, a storage tank, or a combination thereof.

7. The system of claim 1, wherein the controller is configured to control the first compressor to compress only $CO_2$ during startup of the first compressor.

8. The system of claim 1, comprising a dehydration system coupled to the first compressor and configured to dehydrate $CO_2$ compressed by the first compressor.

9. The system of claim 8, comprising a second compressor coupled to the dehydration system and configured to compress $CO_2$ dehydrated by the dehydration system.

10. A system comprising: a compressor configured to compress $CO_2$; and, a controller configured to monitor a gasification system, a first source of $CO_2$, and a second source of $CO_2$ to obtain control feedback, wherein the controller is configured to respond to the control feedback to selectively control a flow of the $CO_2$ to the compressor from the first source during a startup period of the gasification system and from the second source during a steady state period of the gasification system, wherein the controller is configured to transition the compressor from compressing the first source of $CO_2$ to the second source of $CO_2$ during a transition period as the control feedback indicates increasing availability of the second source of $CO_2$, wherein the second source of $CO_2$ originates from a syngas produced by the gasification system during the transition period, and the first source of $CO_2$ is available independent of a state of the gasification system.

11. The system of claim 10, wherein the controller is configured to combine gas flows of the $CO_2$ from both the first source and the second source to the compressor during the transition period from the startup period to the steady state period.

12. The system of claim 10, wherein the $CO_2$ comprises carbon dioxide that is at least approximately 80 percent pure by volume during both the startup period and the steady state period of a gasifier.

13. The system of claim 10, wherein the first source of the $CO_2$ comprises at least one of an enhanced oil recovery (EOR) pipeline, a carbon sequestration system, or a storage tank.

14. The system of claim 10, wherein the second source of the $CO_2$ is available only during operation of a gasifier of the gasification system.

15. The system of claim 10, comprising a gasifier and a gas treatment system configured to produce the second source of the $CO_2$.

16. A system comprising: a gasification system configured to produce a syngas; a first source of $CO_2$; a second source of $CO_2$ comprising a $CO_2$ capture system configured to extract $CO_2$ from the syngas produced by the gasification system; a compression system coupled to the first and second sources of $CO_2$; and a controller configured to start up operations of the compression system with a first flow of $CO_2$ from the first source and transition to steady state operations of the compression system using a second flow of $CO_2$ from the second source of $CO_2$.

17. The system of claim 16, wherein the controller is configured to combine the first and the second flows of $CO_2$ during startup operations.

18. The system of claim 17, wherein the controller is configured to decrease the first flow from the first source of $CO_2$ and increase the second flow from the second source of $CO_2$ during a transition period.

19. The system of claim 18, wherein the $CO_2$ comprises carbon dioxide that is at least approximately 80 percent pure by volume during both the startup period and the steady state period of a gasifier.

20. A system comprising: a first compressor configured to compress $CO_2$; a first valve configured to control flow of a first source of $CO_2$ to the first compressor, wherein the first source of $CO_2$ is not captured from a syngas generated by a gasification system during startup of the gasification system; a second valve configured to control flow of a second source of $CO_2$ to the first compressor, wherein the second source of $CO_2$ is captured from the syngas generated by the gasification system; a sensor to indicate availability of the second source of $CO_2$ captured from the syngas generated by the gasification system; and a controller comprising startup instructions to selectively control the valves in response to feedback from the sensor to transition a compressor intake of the first source of the $CO_2$ to the second source of the $CO_2$ for compression by the first compressor during the startup of the gasification system, and wherein the controller comprises gasification instructions configured to control operation of the gasification system.

21. The system of claim 20, comprising the gasification system.

22. The system of claim 20, comprising a syngas processing system configured to process the syngas generated by the gasification system, wherein the second source of $CO_2$ is obtained from the syngas processing system.

23. A system, comprising: instructions disposed on a non-transitory, machine readable medium, wherein the instructions are configured to: startup a first compressor by compressing a first source of $CO_2$ while a gasification system is unable to provide sufficient $CO_2$; monitor the gasification system to sense availability of a second source of $CO_2$ originating from the gasification system; and transition the first compressor from compressing the first source of $CO_2$ to the second source of $CO_2$ in response to the sensed availability of the second source of $CO_2$ originating from the gasification system.

24. The system of claim 23, wherein the instructions are configured to control operation of the gasification system.

25. The system of claim 23, comprising the first compressor and a controller having the instructions.

26. The system of claim 23, comprising the gasification system.

27. A method, comprising: starting up a first compressor by compressing a first source of $CO_2$ while a gasification system is unable to provide sufficient $CO_2$; sensing availability of a second source of $CO_2$ originating from the gasification system; and transitioning the first compressor from compressing the first source of $CO_2$ to the second source of $CO_2$ in response to the sensed availability of the second source of $CO_2$ originating from the gasification system.

28. The system of claim 27, comprising monitoring operation of the gasification system.

29. The system of claim 27, comprising controlling operation of the gasification system.

* * * * *